(12) United States Patent
Stewart et al.

(10) Patent No.: US 10,859,739 B2
(45) Date of Patent: *Dec. 8, 2020

(54) SYSTEMS AND METHODS OF ABERRATION CORRECTION IN OPTICAL SYSTEMS

(71) Applicant: Finisar Corporation, Horsham, PA (US)

(72) Inventors: Luke Stewart, Gladesville (AU); Glenn Wayne Baxter, Hornsby Heights (AU); Steven James Frisken, Vaucluse (AU)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,013

(22) Filed: Jun. 2, 2019

(65) Prior Publication Data

US 2019/0302330 A1    Oct. 3, 2019

Related U.S. Application Data

(63) Continuation of application No. 14/280,607, filed on May 17, 2014, now Pat. No. 10,310,148.

(60) Provisional application No. 61/826,486, filed on May 22, 2013.

(51) Int. Cl.
*G02B 5/18* (2006.01)
*G02B 6/35* (2006.01)

(52) U.S. Cl.
CPC .............. *G02B 5/18* (2013.01); *G02B 5/1861* (2013.01); *G02B 6/351* (2013.01); *G02B 6/356* (2013.01); *G02B 6/3592* (2013.01)

(58) Field of Classification Search
CPC .......... G02B 5/18; G02B 6/351; G02B 6/356; G02B 6/3592; G02B 5/1861; G02B 5/1809; G02B 5/1828; G02B 5/1842; G02B 5/1847; G02B 5/188; G02B 2005/1804
USPC ......................................................... 359/566
See application file for complete search history.

(56) References Cited

U.S. PATENT DOCUMENTS

| | | | |
|---|---|---|---|
| 5,905,571 A | 5/1999 | Butler et al. | |
| 7,397,980 B2 * | 7/2008 | Frisken ................ | G02B 6/2713 385/15 |
| 2002/0024688 A1 | 2/2002 | Ogasawara et al. | |
| 2002/0030814 A1 | 3/2002 | Mikes et al. | |
| 2005/0249454 A1 * | 11/2005 | Ko ........................ | G02B 6/3564 385/16 |

(Continued)

OTHER PUBLICATIONS

Notification Concerning Transmittal of International Preliminary Report on Patentability (Chapter I of the Patent Cooperation Treaty) for PCT/US2014/038517, dated Dec. 3, 2015, 11 pages, The International Bureau of WIPO, Geneva, Switzerland.

(Continued)

*Primary Examiner* — William R Alexander
*Assistant Examiner* — Henry A Duong
(74) *Attorney, Agent, or Firm* — Blank Rome LLP

(57) ABSTRACT

Described herein is a diffraction grating (1) for use in an optical system. The diffraction grating includes a substrate (2) and an array of elongate diffracting elements (3) arranged in a grating profile across the substrate. The grating profile imparts a predefined phase change to optical beams to at least partially correct the beams for optical aberrations present in the optical system.

22 Claims, 11 Drawing Sheets

(56) References Cited

U.S. PATENT DOCUMENTS

2008/0225291 A1* 9/2008 Konno .................... G01J 3/04
356/328
2009/0273840 A1* 11/2009 McLaughlin ............ G01J 3/02
359/569
2012/0281982 A1 11/2012 Frisken et al.

OTHER PUBLICATIONS

"Notification of Transmittal of the International Search Report and the Written Opinion of the International Searching Authority or the Declaration" for PCT/US2014/038517, dated Oct. 20, 2014, 16 pages, The International Searching Authority/Korean Intellectual Property Office, Daejeon Metropolitan City, Republic of Korea.
Bowman, et al., An SLM-based Shack-Hartmann Wavefront Sensor for Aberration Correction in Optical Tweezers, J. Optics, Nov. 2010, vol. 12, pp. 1-6.
Gibson, et al., A Compact Holographic Optical Tweezers Instrument, Rev. Sci Instrum, vol. 83 2012, 6 pages.

\* cited by examiner

SYSTEMS AND METHODS OF ABERRATION CORRECTION IN OPTICAL SYSTEMS

CROSS-REFERENCE TO RELATED APPLICATION

The present application is a continuation of U.S. patent application Ser. No. 14/280,607, filed on May 17, 2014, entitled "Systems and Methods of Aberration Correction in Optical Systems" which claims priority to U.S. Provisional Patent Application Ser. No. 61/826,486, filed on May 22, 2013, entitled "Systems and Methods of Aberration Correction in Optical Systems". The entire contents of U.S. patent application Ser. No. 14/280,607; and U.S. Provisional Patent Application Ser. No. 61/826,486 are incorporated herein by reference.

FIELD OF THE INVENTION

The present invention relates to optical aberration correction and in particular to a diffraction grating that corrects for optical aberrations in a wavelength selective switch device. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Optical systems inherently suffer loss in signal information due to various forms of optical aberration. In smaller, simpler optical devices, beams can be propagated along trajectories closely parallel to the optical axis. In these "paraxial" configurations, aberrations are small and can generally be ignored in practice. However, as more complex devices are built to perform advanced functions, the need to propagate beams off-axis and outside the paraxial region is becoming increasingly important. In these "higher order optics" situations, a number of monochromatic optical aberrations become more distinct. In particular, off-axis curvature of the focal plane of optical elements becomes a concern. So too does spherical aberration and optical coma.

The degree of the aberrations is generally related to the size and profile of the optical beams in the system. In wavelength selective switch (WSS) devices it is often advantageous to reshape the beam profile to be highly asymmetric. For example, in liquid crystal on silicon (LCOS) based switches, elongated beam profiles are advantageous for efficiently switching many wavelength channels simultaneously. Larger and more asymmetric beams generally experience higher aberrations than smaller symmetric beams.

The asymmetric nature of certain WSS designs means that the beam spot incident onto the switching engine (LCOS, MEMs mirrors etc.) can have significant aberrations, including optical coma. As the push for smaller beam spots to achieve sharper channels increases, these aberrations limit the potential of these off-axis systems.

In spectrometer-type optical systems, aberration correction is often made by moving to a two mirror Czerny-Turner system. This system gives equal and opposite aberrations for each mirror reflection, allowing a symmetric Gaussian spot to be focused at the image plane. This type of solution is possible in a WSS system, but it comes with drawbacks: the second mirror adds cost to the system; the design creates a larger spatial footprint for the optical setup; and the optical alignment procedure is more complex. These all move against the design goals for new WSS products.

SUMMARY OF THE INVENTION

It is an object of the invention, in its preferred form to provide systems and methods of aberration correction in optical systems.

In accordance with a first aspect of the present invention, there is provided a diffraction grating for use in an optical system, the grating including an array of spaced-apart diffraction lines configured to spatially separate wavelength channels within incident optical beams and also to impart a predefined phase change to the optical beams to at least partially correct the beams for optical aberrations present in the optical system.

The array of diffraction lines preferably defines a phase profile which at least partially reverses aberrations to optical beams by the optical system. The spacing of adjacent diffraction lines preferably varies as a function of position across the grating in a dimension of diffraction based on the optical aberrations to optical beams present in the optical system. The diffraction lines preferably have a curvature that varies across the grating based on the optical aberrations to optical beams present in the optical system. The optical aberration to optical beams preferably includes one or both of optical coma and spherical aberration of optical beams.

In accordance with a second aspect of the present invention, there is provided an optical switch, including:

at least one input port for projecting an input optical beam;

at least one output port for receiving an output optical beam;

switching optics for selectively switching the optical beam along predetermined paths between the at least one input port and the at least one output port; and a diffractive element configured for:
  i. spatially separating wavelength channels within the optical beam;
  ii. imposing a predetermined phase change to the wavelength channels to at least partially correct for optical aberrations to the input optical beam.

In accordance with a third aspect of the present invention, there is provided a method of generating an aberration correcting phase profile for use in an optical system, the method including:
  a) in a model of the optical system, inserting a phase manipulating element at a first predetermined point, the variable phase manipulating element having a controllable phase profile;
  b) measuring properties of optical beams at a second predetermined point in the optical system; and
  c) varying the phase profile of the phase manipulating element such that the measured beam properties substantially match predetermined reference beam properties.

Step b) preferably includes calculating the $M^2$ value of the optical beams at the predetermined point in the optical system. Step c) preferably includes varying the phase profile to substantially minimize the sum of the $M^2$ values.

The phase profile is expressed as polynomials. The step of minimizing the sum of $M^2$ values is preferably performed by selectively modifying weight terms of the polynomials.

The reference beam properties are preferably indicative of an ideal Gaussian beam.

The method of the third aspect preferably includes the further step:

d) translating the phase profile into a corresponding diffraction grating profile.

The method of the third aspect preferably further includes the step of:

e) writing the grating profile onto a diffraction grating substrate.

The first predetermined point is preferably at or adjacent the position of a diffraction grating in the optical system. The second predetermined point is preferably at or adjacent a switching device in the optical system.

In accordance with a fourth aspect of the present invention, there is provided a method of reducing optical aberrations of optical beams in a wavelength selective switch, the method including:

utilizing a diffractive phase correction element to substantially reverse aberration effects to the optical beams provided by said switch.

The diffractive phase correction element is preferably a diffraction grating having a plurality of spaced-apart diffraction lines and wherein the diffraction lines define a profile that provides for substantial reversal of the aberration effects to the optical beams.

The spacing of the diffraction lines is preferably specified to impart a predefined phase change to the optical beams.

In accordance with a fifth aspect of the present invention, there is provided a phase correcting element for use in an optical system, the element including an array of phase manipulation elements, wherein the manipulation elements impart a predefined phase change to optical beams to at least partially correct the beams for optical aberrations present in the optical system.

In accordance with a sixth aspect of the present invention there is provided a diffraction grating having a grating profile configured to diffract optical beams and impose a phase change to the beams to at least partially correct the beams for optical aberrations.

BRIEF DESCRIPTION OF THE DRAWINGS

Preferred embodiments of the invention will now be described, by way of example only, with reference to the accompanying drawings in which.

DETAILED DESCRIPTION

Embodiments of the invention will be described herein with specific reference to correcting optical aberrations in wavelength selective switch (WSS) devices. However, the person skilled in the art will appreciate that the principles described herein are applicable to other optical systems and devices. The embodiments described herein relate to defining a diffraction grating with a grating profile that imposes a specific phase change on optical beams to correct for optical aberrations.

General Overview

Figure 1:
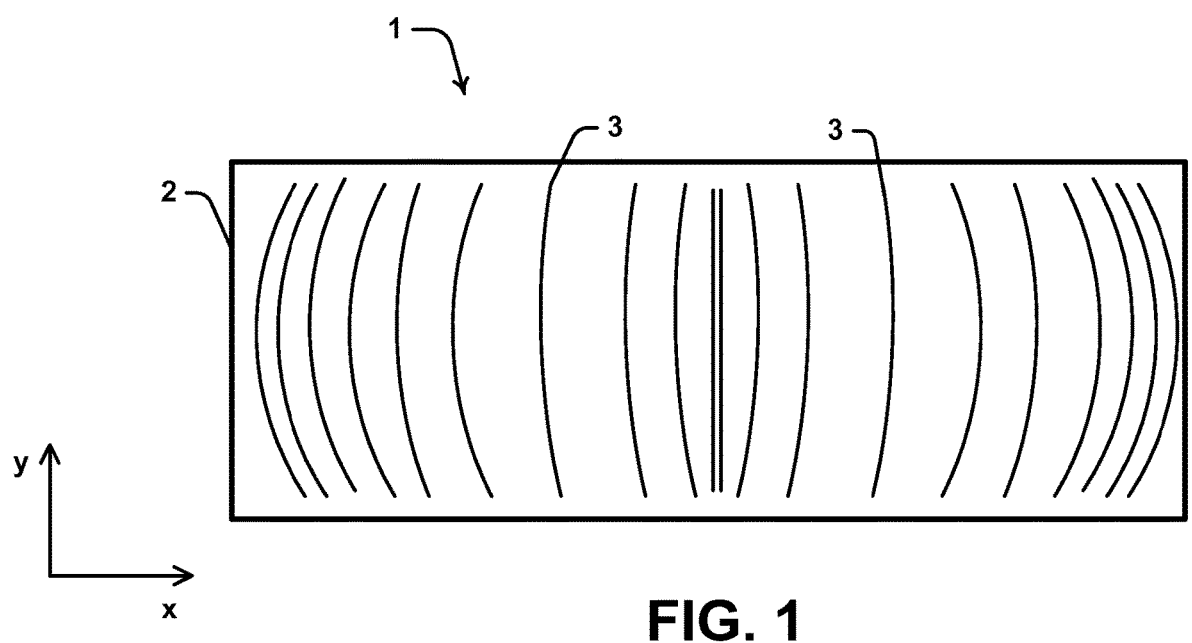
FIG. 1 illustrates an exemplary diffraction grating having a grating profile configured to correct for optical aberrations.

Referring to FIG. 1, there is illustrated schematically a diffraction grating 1 for use in an optical system. The diffraction grating includes a substrate 2 and an array of elongate diffracting elements 3 arranged in a grating profile across substrate 2. Each diffracting element includes a relative degree of curvature across the face of grating 1 (including zero curvature). Exemplary diffracting elements are diffraction lines and include grooves or ridges for a reflective grating, or slots for a transmissive grating. The grating profile imparts a predefined phase change to incident optical beams to at least partially correct the beams for optical aberrations present in the optical system.

The grating profile formed on grating 1 is defined based on the optical aberrations to the optical beams that propagate through the optical system and is different for each optical system. The amount and type of optical aberrations in the optical system are determined through an initial measurement procedure described below. The spacing of adjacent elements 3 varies as a function of position across substrate 2 in the diffraction dimension (x-axis) based on the optical aberrations measured in the initial procedure. Furthermore, diffracting elements 3 have a curvature that also varies across substrate 2 in the diffraction dimension based on the optical aberrations measured in the initial procedure.

Overview of Exemplary WSS Framework

Figure 2:
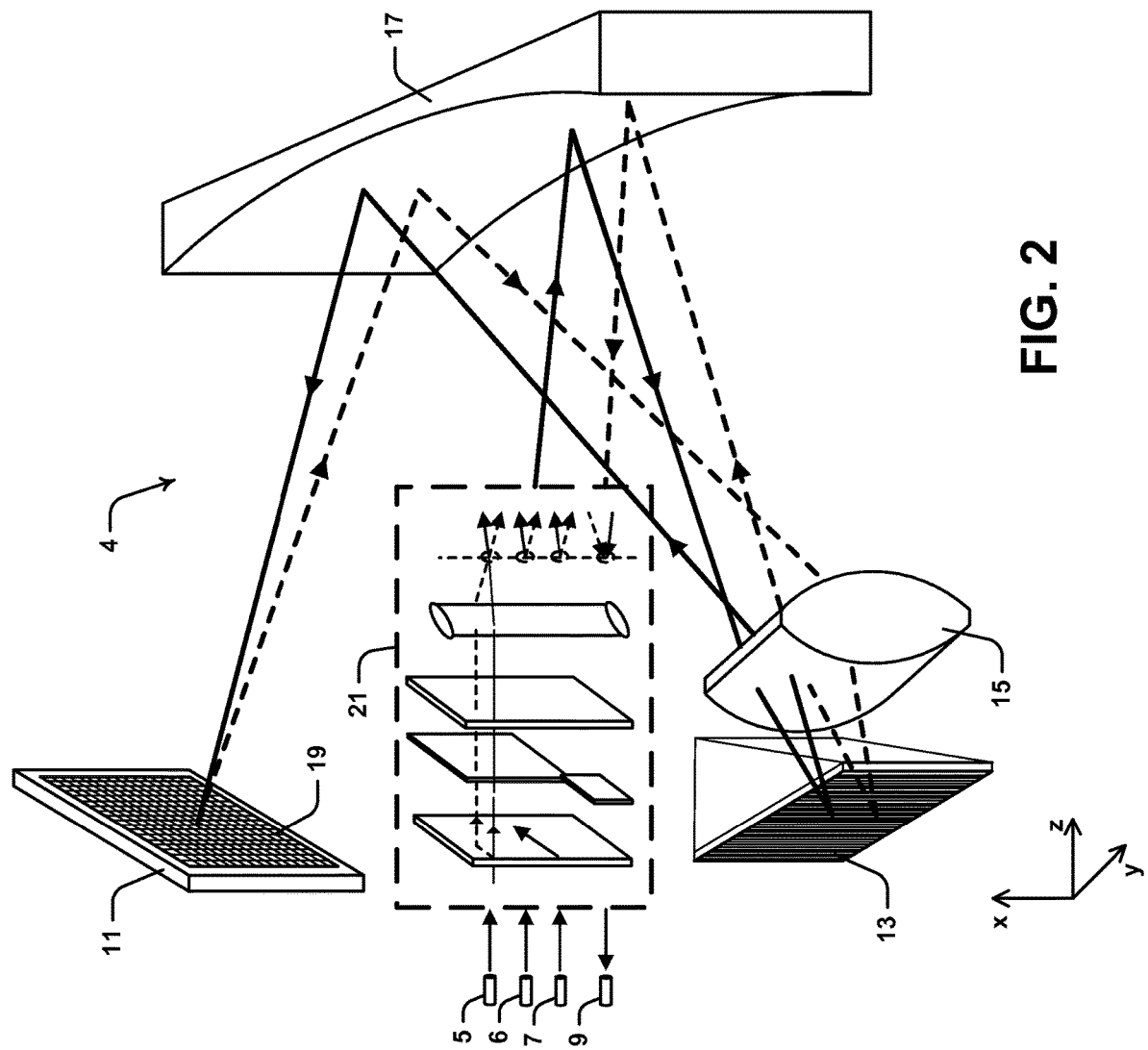
FIG. 2 illustrates schematically the optical layout of an exemplary WSS device.

With reference to FIG. 2, a general overview of WSS devices will now be described. FIG. 2 illustrates schematically an exemplary WSS optical switching device 4 configured for switching input optical beams from three input optical fiber ports 5, 6 and 7 to an output optical fiber port 9. It will be appreciated that device 4 is reconfigurable such that input ports 5, 6 and 7 are able to be used as outputs and output port 9 used as an input. The optical beams are indicative of WDM optical signals, as mentioned above. On a broad functional level, device 4 performs a similar switching function to that described in U.S. Pat. No. 7,397,980 to Frisken, entitled "Dual-source optical wavelength processor" and assigned to Finisar Corporation, the contents of which are incorporated herein by way of cross-reference. The optical beams propagate from input ports 5, 6 and 7 in a forward direction and are reflected from an active switching element in the form of a liquid crystal on silicon (LCOS) device 11 (described below) in a return direction to output port 9. In other embodiments, other types of active switching elements are used in place of LCOS device 11, including arrays of individually controllable micro-electromechanical (MEMs) mirrors.

Device 4 includes a wavelength dispersive grism element 13 for spatially dispersing the individual wavelength channels from an input optical beam in the direction of a first axis (y-axis). It will be appreciated by persons skilled in the art that the dispersive element is not limited to a grism configuration, but may be any type of diffraction grating element. Grism element 13 operates in a manner described in U.S. Pat. No. 7,397,980. That is, to spatially separate the constituent wavelength channels contained within each optical beam in the y-axis according to wavelength. Grism 13 includes a diffraction grating portion which, in addition to the spatial diffraction function, also at least partially corrects beams for optical aberrations present in device 4.

A lens 15 is positioned adjacent to grism 13 such that the optical beams traverse the lens both prior to incidence onto grism 13 and after reflection from the grism. This double pass of lens 15 acts to collimate beams in the direction of a second axis (x-axis). Similarly, in propagating between input ports 5, 6 and 7 and LCOS device 11, the beams reflect twice off a cylindrical mirror 17. Mirror 17 has appropriate curvature such that each dispersed channel is focused onto the LCOS device in the y-axis.

The dispersed wavelength channels are incident onto LCOS device 11, which acts as a reflective spatial light modulator to actively independently steer each channel in the x-axis. At the device level, LCOS device 11 operates in a similar manner to that described in U.S. Pat. No. 7,092,599 to Frisken, entitled "Wavelength manipulation system and method" and assigned to Finisar Corporation, the contents of which are incorporated herein by way of cross-reference. As mentioned above, in other WSS designs, other types of switching element are used in place of LCOS device 11, such as micro electro-mechanical mirror (MEMs) arrays.

Overview of Aberrations in WSS Devices

In the frequency domain, optical devices can be characterized in terms of a bandpass filter shape that describes the filtering effects that a device imposes on optical beams. The bandpass filter generated by a WSS can be expressed as the convolution of the aperture formed at the image plane with the optical transfer function of the device. In modeling an optical system, the aperture is typically chosen to be a rectangular function, and so any features in the overall filter shape are generally defined by the optical transfer function, which is in turn defined by the shape of the focused beam spot in the frequency dispersed axis.

Figure 3:
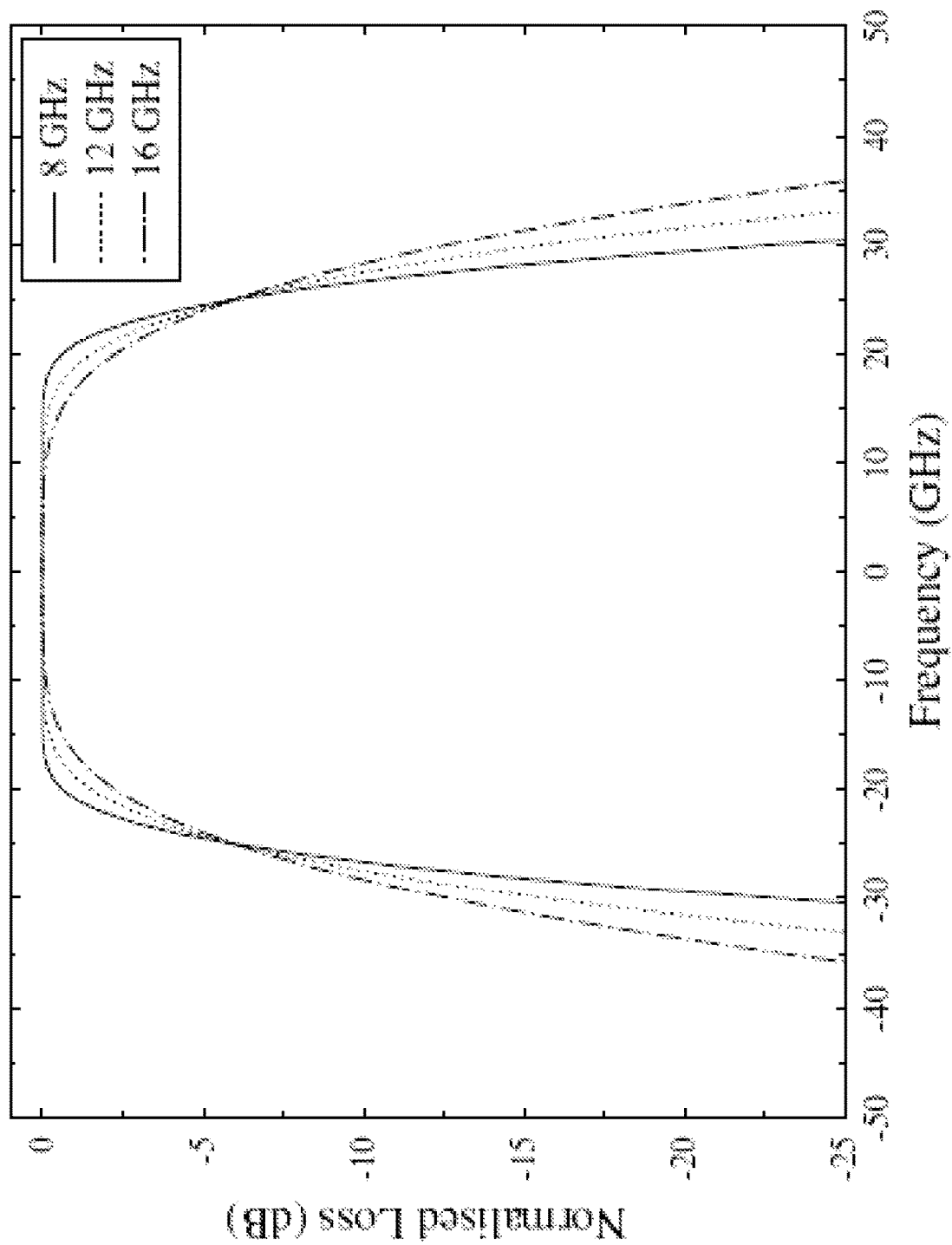
FIG. 3 illustrates a graph of three exemplary Gaussian filter shapes having spot sizes (bandwidths) of 8 GHz, 12 GHz and 16 GHz respectively.

Since conventional WSS systems use single mode optical fiber inputs, an ideal aberration free WSS should also have a beam spot with a Gaussian distribution at the image plane. This will create a well defined, symmetric, bandpass filter where the sharpness of the edges is determined by the size of the spot in the image plane. FIG. 3 illustrates three exemplary Gaussian filter shapes for optical spot sizes (in the frequency domain) of 8 GHz, 12 GHz and 16 GHz respectively. Here, the spot size is referenced to the dispersion of the device.

Figure 4:
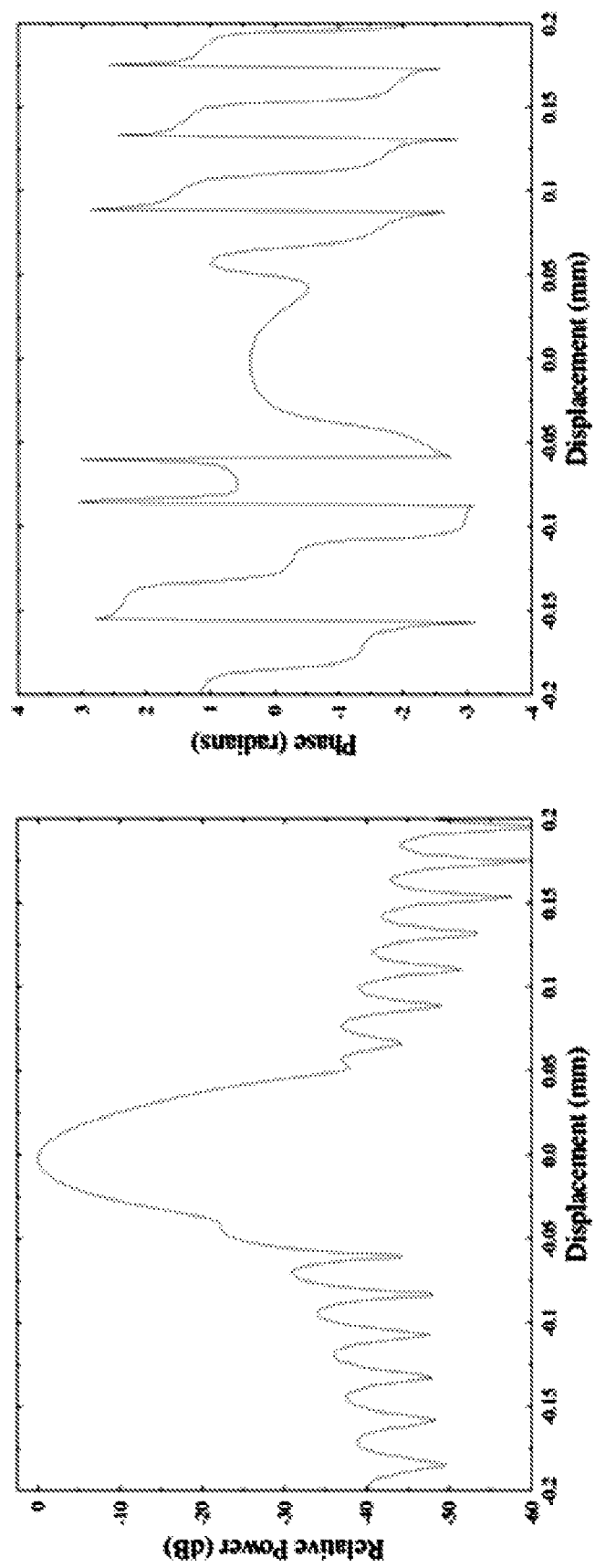
FIG. 4 illustrates irradiance (power) and phase graphs of the beam spot in the image plane of an exemplary model WSS device.
Figure 5:
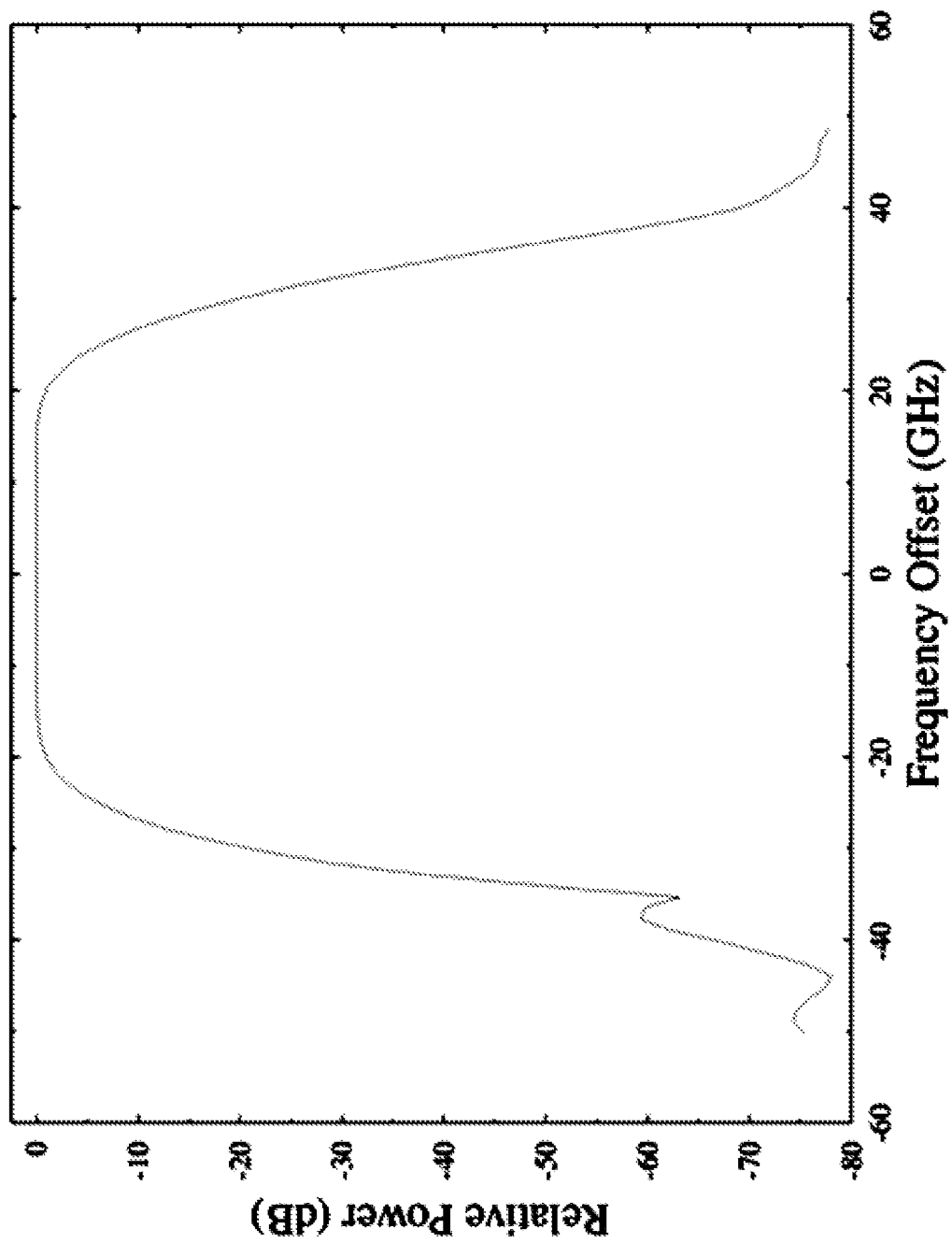
FIG. 5 illustrates a graph of the filter shape for the model WSS device of FIG. 2.

When optical aberrations are taken into account in the system, the beam spot deviates from a perfect Gaussian, and these imperfections are mirrored in the shape of the corresponding filter shape of the device. The imperfections in filter shape arising from optical aberrations degrade the system performance for parameters such as the optical filter width. FIG. 4 illustrates modeled irradiance (power) and phase plots of the spot in the image plane of an exemplary WSS device (modeled in the Radiant Zemax optical modeling software). The majority of the irradiance is observed to lie between ±0.05 mm. Over the same range in the phase profile, a sharp feature at the left edge is observed, which corresponds to a side lobe in the irradiance profile. These spectral features, caused by the optical aberrations, affect the resulting filter shape that is defined by the beam spot (optical transfer function). The resulting filter shape for the modeled WSS device is illustrated in FIG. 4.

Example optical aberrations commonly experienced in WSS devices include spherical aberration and optical coma. Spherical aberration arises from the imperfect focusing of curved lenses and mirrors. Optical rays that strike the periphery of a lens or mirror are focused to a closer point than rays passing through the center of the lens/mirror. Therefore, spherical aberration is realized as a radial position dependent focusing. Optical coma occurs when optical rays strike a mirror or lens at an angle to the optical axis or at off-axis positions. The result is that individual rays experience a variation in magnification over the optical element and the rays are not focused to the same point in the image plane. In WSS device 4 of FIG. 2, coma is dominant as the system has a strong off-axis nature, where the beam strikes mirror 17 away from the centre of curvature twice before it strikes the image plane. Spherical aberration is also present to a lesser extent.

WSS device 4 of FIG. 2 uses a single mirror design, which is advantageous for maintaining a small optical footprint and reducing the number and complexity of components. However, this design uses cylindrical mirror 17 in an off-axis configuration, which leads to coma aberrations on the beam (as well as spherical aberration that will generally be present in these systems). In some cases, system designers are willing to incur the loss in optical performance associated with these aberrations. However, in more sensitive optical systems, there is a desire to more tightly control the aberrations to reduce these penalties.

Two-mirror WSS systems (such as the Czerny-Turner monochromator approach) are able to passively compensate for coma effects by undoing the aberrations of a first mirror with a pass of the second mirror. However, these types of systems have disadvantages associated with additional alignment complexity, larger optical footprint and increased cost.

The present invention incorporates aberration correction into a single mirror, off-axis WSS system, such as that illustrated in FIG. 2, by adding or modifying an existing phase correction element to the system that essentially undoes aberrations on the beam and pre-biases negative aberrations for those predicted further along the optical path. Embodiments of the invention described herein incorporate the phase correction into the diffraction grating element (e.g. grism 13 of FIG. 2), where small changes to the line-spacing of the grating can create a phase profile on the optical beam. It will be appreciated that in some embodiments, certain aspects of phase correction can also be incorporated in other ways such as programming a phase function into LCOS device 11. In a further embodiment, phase correction is incorporated into a two-mirror design to provide additional aberration correction over and above that provided by the symmetric mirror design.

Description of Aberration Correction Diffraction Grating

To achieve aberration correction in a single mirror WSS system, the present invention utilizes a diffraction grating having a grating profile that is specified based on the optical aberrations present in the optical system (WSS device). In the case of device 4 of FIG. 2, the grating profile of grism 13 is specified to impart a predefined phase change to optical beams to at least partially correct the beams for optical aberrations present in the optical system. In particular, the shape and spacing of adjacent diffraction grooves is a function of position across the substrate in the diffraction dimension according to a variation profile that is based on the amount of optical aberration in the optical system.

Figure 6:
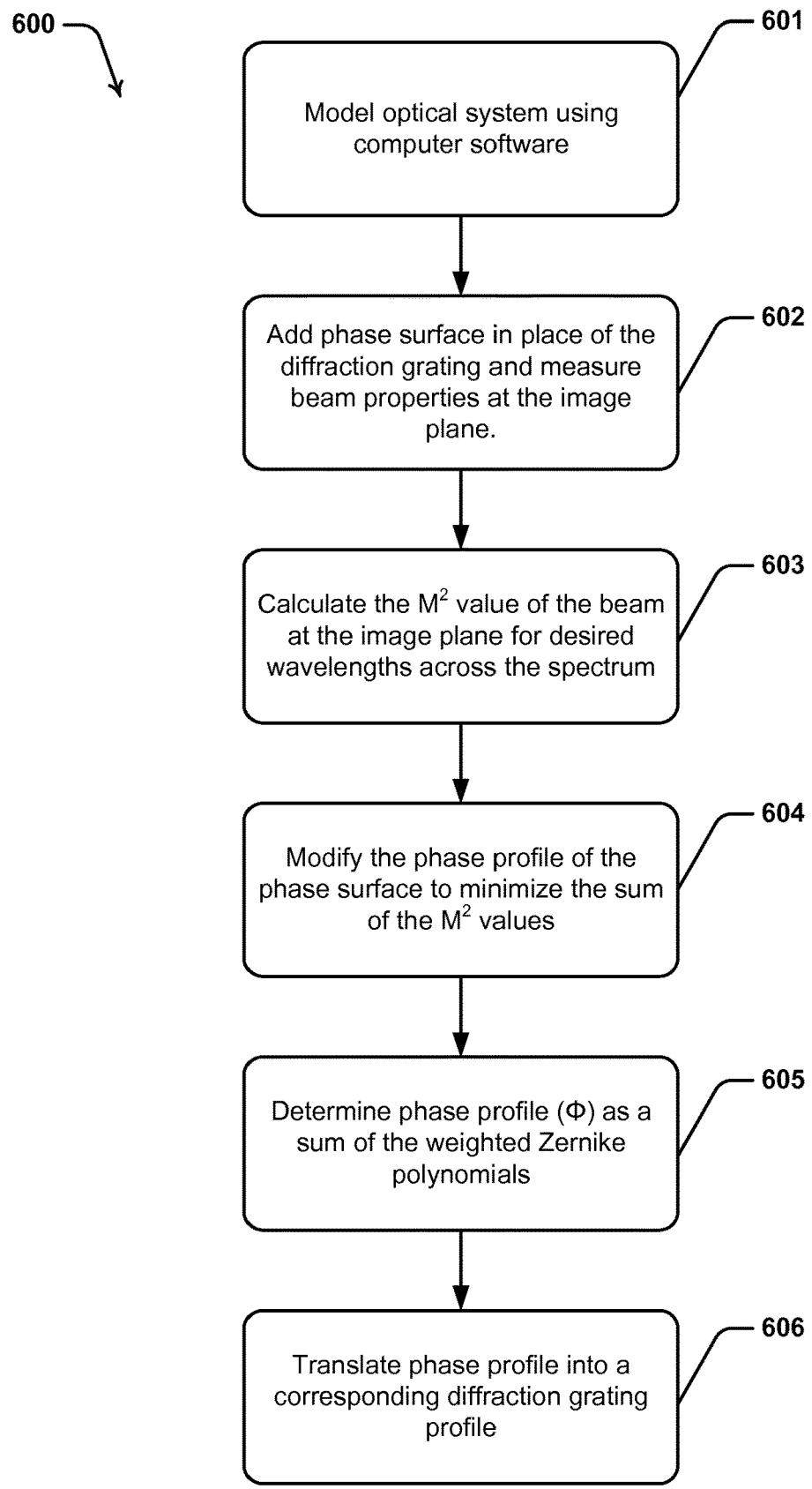
FIG. 6 illustrates an exemplary process flow of the steps performed to determine a required diffraction grating profile which compensates for aberrations in an optical system.

In one embodiment, to determine the required grating profile which compensates for aberrations, method 600 of FIG. 6 is performed. Method 600 will be described with reference to device 4 of FIG. 2. However, it will be appreciated that method 600 is able to be applied to other optical systems that include a diffraction grating or equivalent diffractive element.

At step 601, the optical device is modeled using computer software such as the Radiant Zemax optical design software. In the model, at step 602, a reconfigurable phase surface is added in place of grism 13. In some modeling software, the phase surface is able to be implemented directly as a surface having phase properties that can be specified. In other modeling software, the phase surface is implemented by way of an object having a controllable phase profile. In each case, the phase surface provides a reconfigurable two-dimensional phase profile, which can be varied to accommodate for optical aberrations in the device. In effect, the phase modifying element can be considered as a controllable reference diffraction grating. Following insertion of the phase surface, various beam properties are measured at the LCOS switching device 11, such as the size and position of a beam waist.

In some embodiments, real data on optical aberrations in an optical system is obtained using a calibration diffraction grating having conventional grating characteristics without aberration correction. In one particular embodiment, a reconfigurable diffraction grating is used and the initial calibration steps for determining the optical aberration compensation is performed with the reconfigurable grating in a first 'reference' state. The appropriate corrective grating profile is then determined and the diffraction grating is changed into a second 'operating' state using the corrective grating profile.

At step 603, from the measured beam information, $M^2$ values of the beam at LCOS device 11 (image plane) are calculated in the y-axis for desired wavelengths across the spectrum. $M^2$ is an optical beam quality measure defined as the ratio of the beam parameter product (BP) of the measured beam to that of an ideal Gaussian beam. BP is the product of the divergence angle of the optical beam (half-angle) and the radius of the beam at its narrowest point (the beam waist). The ideal case for a WSS system is to have $M^2=1$ and the beam waist located at the image plane for all wavelengths and polarizations.

At step 604, a mathematical optimization routine is implemented to minimize the sum of the $M^2$ values obtained in step 603, while maintaining beam waist position. The phase profile of the phase surface described in step 602 is represented as a combination of polynomials and the phase profile is varied by modifying weight terms of the polynomials. In some embodiments, the polynomials are linear polynomials of degree 1. In other embodiments, the phase profile is represented by other mathematical expressions and higher degree polynomials including Zernike polynomials. In some embodiments, other minimization techniques are employed.

Zernike polynomials are a set of polynomials which are orthogonal over the area of a unit disk, and are generally expressed in polar coordinates. In optics, they are known to be used to describe aberrations on an optical beam. Along with modifying the weight terms for these polynomials, some optical path lengths in the device are also allowed to change within system calibration constraints during the optimization routine. This is done to maintain the beam waist location at the image plane. By minimizing the sum of $M^2$ values, the optimization procedure defines the system with the fewest aberrations at the image plane.

At step 605, with the optimized Zernike terms known, a phase profile ($\Phi$) is constructed at the phase surface which defines the required phase change to an optical beam at that surface to compensate for aberrations in the system. In embodiments described herein, two key Zernike terms are utilized: a term characterizing the coma aberration; and a term characterizing the spherical aberration/focus. However, in other embodiments, other combinations of Zernike terms are used which describe various other optical aberrations.

Phase profile ($\Phi$) of the beam at the phase surface is calculated using the following summation of weighted Zernike polynomials:

$$\Phi = M \sum_{i=1}^{N} 2\pi A_i Z_i(\rho, \varphi)$$

where: M is a diffraction order,
A are the Zernike weights calculated in Zemax,
N is the number of Zernike terms in the series
Z are the Zernike polynomials, each of which are a function of the polar co-ordinates $\rho$ and $\omega$.

The first 15 Zernike polynomials used in these calculations are shown in the table below:

| Term | $Z(\rho, \varphi)$ |
| --- | --- |
| 1 | 1 |
| 2 | $\rho\cos\varphi$ |
| 3 | $\rho\sin\varphi$ |
| 4 | $2\rho^2 - 1$ |
| 5 | $\rho^2\cos2\varphi$ |
| 6 | $\rho^2\sin2\varphi$ |
| 7 | $(3\rho^2 - 2)\rho\cos\varphi$ |
| 8 | $(3\rho^2 - 2)\rho\sin\varphi$ |
| 9 | $6\rho^4 - 6\rho^2 + 1$ |
| 10 | $\rho^3\cos3\varphi$ |
| 11 | $\rho^3\sin3\varphi$ |
| 12 | $(4\rho^2 - 3)\rho^2\cos2\varphi$ |
| 13 | $(4\rho^2 - 3)\rho^2\sin2\varphi$ |
| 14 | $(10\rho^4 - 12\rho^2 + 3)\rho\cos\varphi$ |
| 15 | $(10\rho^4 - 12\rho^2 + 3)\rho\sin\varphi$ |

Figure 7:
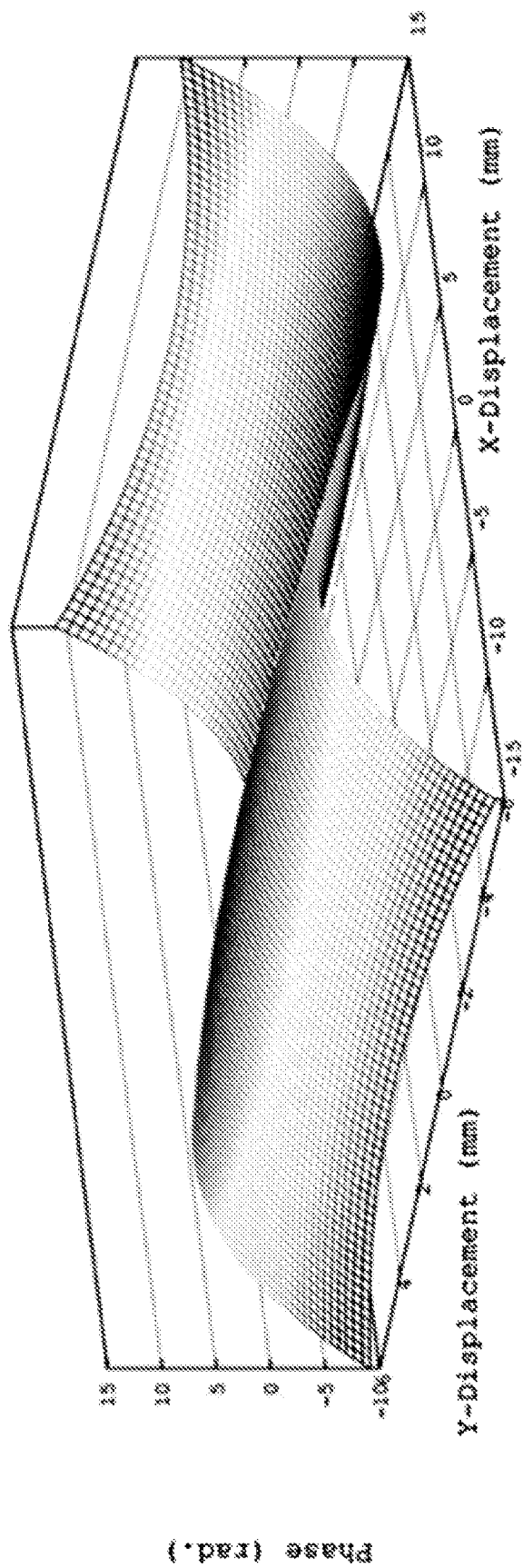
FIG. 7 illustrates a graph of an example phase profile calculated at a surface in a simulated WSS system.

An example phase profile ($\Phi$) calculated from simulating device 4 of FIG. 2 is shown in FIG. 7. For this particular optical system, the phase extends to ±10 radians over the size of the component. The particular phase profile will be dependent on the optical system being used and will generally be different for each system.

In another embodiment, a polynomial series in (x,y) coordinates is used which gives rise to the following phase profile:

$$\Phi = M \sum_{i=1}^{N} A_i P_i(x, y)$$

Wherein $A_i$ are the weights for each polynomial term $P_i$. In this embodiment, $P_1=1$, $P_2=x$, $P_3=y$, $P_4=x^2$, $P_5=xy$, $P_6=y^2$, $P_7=x^3$, ... etc. So phase corrections terms can easily be added in x, y or both dimensions simply by changing the weight of any of these polynomial terms.

Referring again to FIG. 6, finally at step 606, the phase profile (Φ) is translated into a corresponding diffraction grating profile. The overall phase for the diffraction grating profile is represented as the sum of the phase variation of the standard diffraction and the phase profile of the aberration correction. The latter is the required phase change to an optical beam at that surface to compensate for aberrations in the system calculated in steps 604 and 605. The overall phase $\Phi_{Total}$ is represented as:

$$\Phi_{Total} = \Phi_{Grating} + \Phi_{Aberration}.$$

The phase for the physical grating is related to the line (e.g. groove, ridge or slot) density of the diffraction grating as follows:

$$\Phi_{Grating}(x, y) = 2\pi \cdot \text{Line Density} \cdot y$$

over the aperture of the diffraction grating. In this embodiment, the standard diffraction grating is defined in the y dimension only. The aberration correction ($\Phi_{Aberration}$) in this case is in polar co-ordinates but, in the general case, this is in Cartesian co-ordinates. A simple conversion between polar and Cartesian can be used to project into the correct co-ordinate space. Once the expressions are in the same co-ordinate space, an addition of the polynomial terms is used to find $\Phi_{Total}$. Finally, the $n^{th}$ grating line is defined (along the y-axis in this case) by the following:

$$\Phi_{Total} = 2\pi n$$

where n is an integer. This relationship comes from the basic definition of a diffraction grating, where each line represents a shift of $2\pi$ in phase. The end result is a variable line spacing, where the variation from the standard line spacing is determined by the phase profile of the aberration correction.

The profile is written into the diffraction grating of grism 13 (or, in the case of another optical system, into the corresponding diffractive device) in a conventional manner such as photolithographic and mechanical etching techniques. In one embodiment, the steps of method 600 are coded as software in instructions that are performed by a processor. That processor may be in communication with the machine or device that performs the etching of the physical diffraction grating.

To achieve the required diffraction grating profile, the spacing of adjacent diffracting elements (such as diffracting grooves) is varied as a function of position across the substrate in the dimension of diffraction based on the optical aberrations measured in the simulated optical system. In some embodiments where the diffracting elements are elongate (such as mechanically etched grooves, ridges or lines) the elements have a curvature that varies across the substrate based on the optical aberrations present in the optical system.

The resulting diffractive grism 13 (or equivalent diffractive device) spatially disperses each wavelength channel and imposes phase changes to each channel to compensate for optical aberrations that are imposed on the beams before and after grism 13. The grating optimization routine described above is also able to correct the total dispersion of the spectrum, as well as control the spot size of the beam at the image plane.

Figure 8:
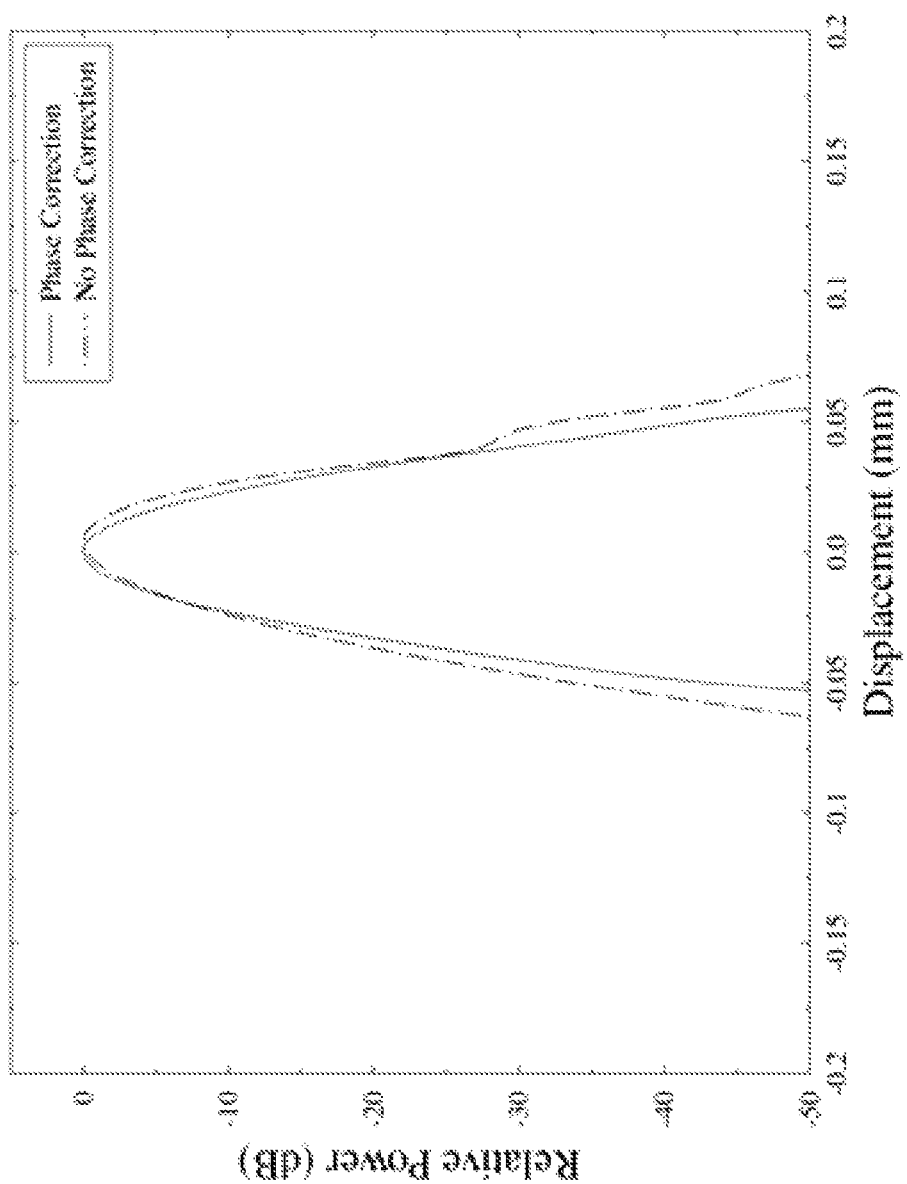
FIG. 8 illustrates a graph of an irradiance profile of an imaged beam passed through a simulated WSS system, both with and without a phase aberration correction.
Figure 9:
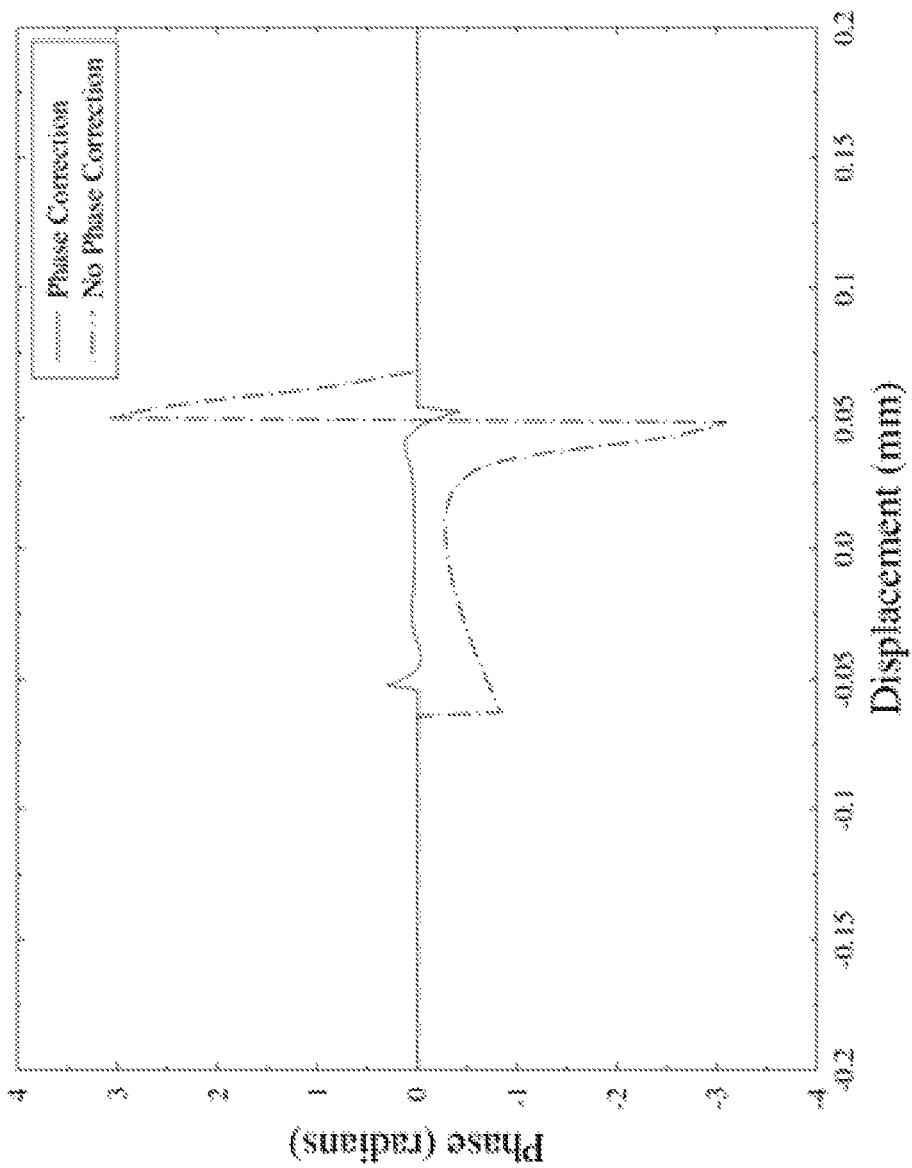
FIG. 9 illustrates a graph of a phase profile of an imaged beam passed through the simulated WSS, both with and without a phase aberration correction.

Results from a simulated WSS similar to device 4 of FIG. 1 will now be described with reference to FIGS. 8 to 11. Referring initially to FIG. 8, there is illustrated the irradiance profile of an imaged beam (the centre wavelength of the C-Band) passed through the simulated WSS both with and without an applied phase aberration correction. FIG. 9 illustrates the corresponding phase profile for the same simulated WSS. Comparing the curves in FIG. 8, it can be seen that, with the phase correction in place, the beam spot more closely represents a Gaussian shape while maintaining approximately the same spot size. The strong side lobes are removed and the spot is significantly more symmetric around the centre of the beam. Comparing the curves in FIG. 9, the phase of the beam in the image plane shows a similar improvement when the aberration correction is put in place. The sharp features at the edge of the beam are significantly reduced in magnitude, and the phase profile is flatter overall.

Figure 10:
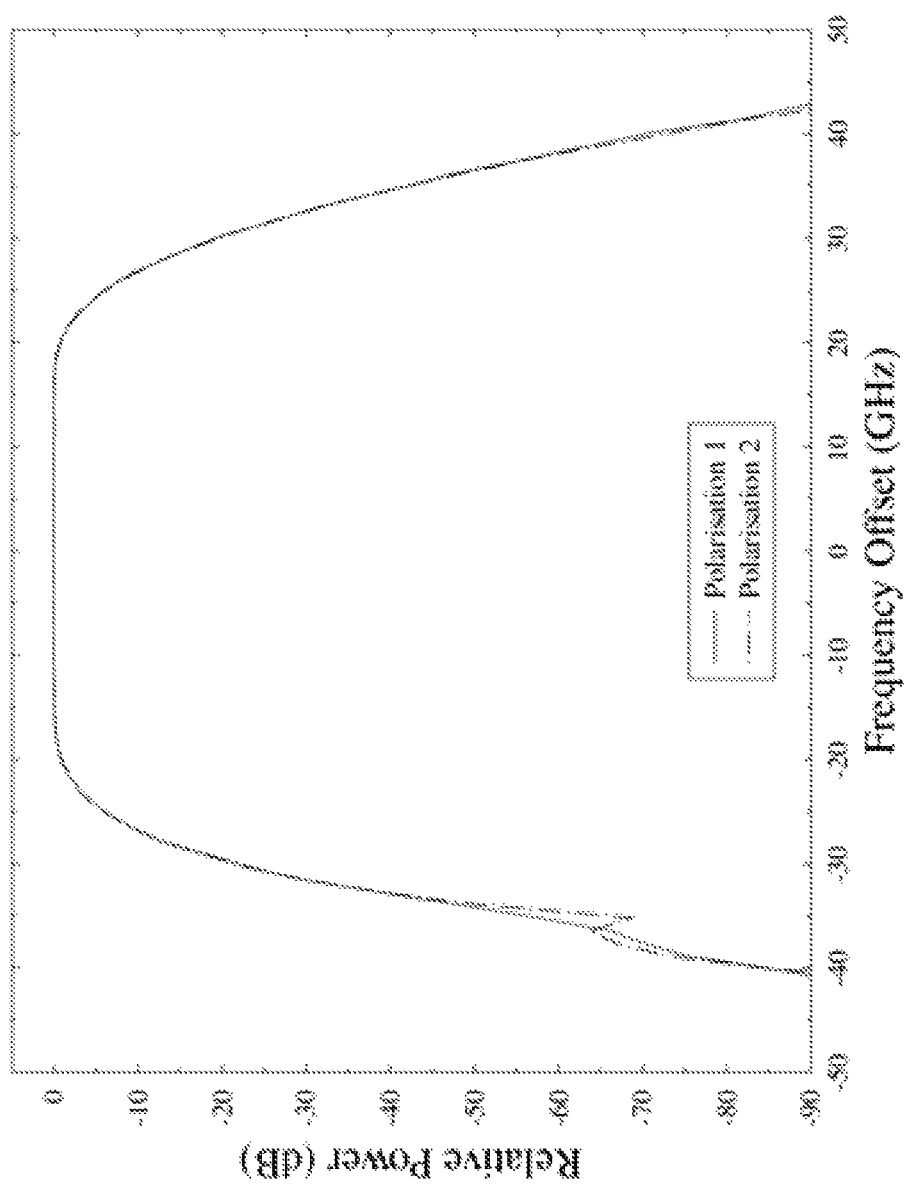
FIG. 10 illustrates a graph of the overall filter shape of the simulated WSS device without aberration correction applied.
Figure 11:
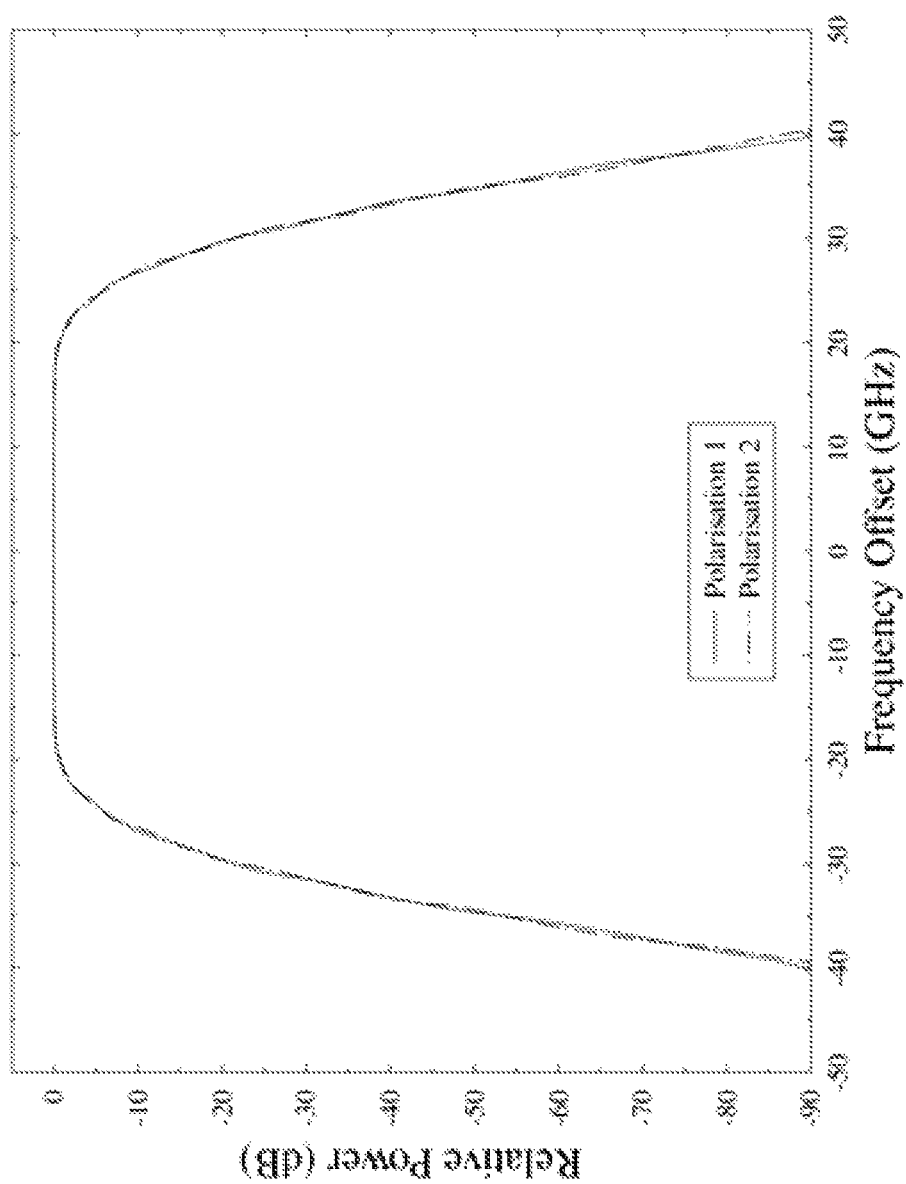
FIG. 11 illustrates a graph of the overall filter shape of the simulated WSS device with aberration correction applied.

Referring to FIGS. 10 and 11, the overall filter shape of the simulated WSS device is shown, as measured by a selected wavelength channel passed through the device. FIG. 10 illustrates the filter shape of two orthogonal polarization states without aberration correction applied. The uncorrected filter shape illustrates similar features to that seen in the irradiance profile of FIG. 8: a side lobe on the channel and significant asymmetry to the profile as a whole. The left edge of this channel is sharper than the right edge. FIG. 11 illustrates the filter shape of the same two polarization states when the aberration correction is applied. As observed, the channel filter shape is substantially more symmetric and lacks edge features. The filter shapes match very closely to the ideal filter shapes shown in FIG. 3 (which are simply the convolution of an ideal Gaussian beam with a rectangular aperture) and the two polarization states more closely conform with each other.

Conclusions

It will be appreciated that the disclosure above provides various systems and methods of aberration correction in optical systems.

In embodiments of the present invention, phase correction is incorporated into the diffraction grating in a WSS. The phase correction is achieved by subtly changing the line spacing and curvature of the diffraction lines of the diffraction grating as a function of position. The phase correction profile of the diffraction grating provides a phase adjustment to the optical beams, undoing the aberrations already present, and pre-biasing negative aberrations for those that will be present later in the optical path. This aberration correction allows the focused spot at the image plane to be made smaller and more symmetric, leading to sharper channel profiles. Significantly, these improvements can be made with a small change to an existing optical device or system. Embodiments of the invention do not require a more complex WSS design, or additional correction elements.

Embodiments of the present invention incorporate the aberration correction advantages associated with two-mirror WSS systems into the simpler more efficient designs of single-mirror WSS systems. Simulated results of embodiments of the invention show that the beam spot and optical filter have an improved symmetry and the phase is flatter at the focal plane.

It will be appreciated that the techniques applied herein are applicable to optical elements other than the single diffraction grating used in a WSS. For example, in one embodiment, an optical element separate to the diffraction grating is able to be incorporated into a WSS and a modified phase profile etched into the element.

Interpretation

Throughout this specification, use of the term "element" means either a single unitary component or a collection of components that combine to perform a specific function or purpose.

Throughout this specification, use of the terms "beam spot" and "spot" means the optical beam profile as viewed in a cross-section across the direction of beam propagation. By way of example, a Gaussian beam will have a circular beam spot.

Throughout this specification, use of the terms "correction" and "correcting" in the context of aberration correction mean that the optical aberrations in the system are at least partially corrected or compensated for when compared to a system without aberration correction.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of generating an aberration correcting phase profile for use in a multi-wavelength channel optical system comprising a plurality of individual wavelength channels, the method comprising:
    a) in a model of the multi-wavelength channel optical system comprising a plurality of individual wavelength channels, inserting a variable phase manipulating element at a first predetermined point in the multi-wavelength channel optical system, the variable phase manipulating element having a controllable phase profile;
    b) measuring properties of optical beams at a second predetermined point in the multi-wavelength channel optical system; and
    c) varying the phase profile of the variable phase manipulating element such that the measured optical beam properties substantially match predetermined reference optical beam properties.

2. The method according to claim 1 wherein step b) comprises calculating the $M^2$ value of the optical beams at the predetermined point in the multi-wavelength channel optical system.

3. The method according to claim 2 wherein step c) comprise varying the phase profile to substantially minimize the sum of the $M^2$ values.

4. The method according to claim 3 wherein the phase profile is expressed as polynomials.

5. The method according to claim 4 wherein the minimizing the sum of $M^2$ values is performed by selectively modifying weight terms of the polynomials.

6. The method according to claim 1 further comprising translating the phase profile into a corresponding diffraction grating profile.

7. The method according to claim 6 wherein the corresponding diffraction grating profile comprises a spacing of adjacent diffracting elements that vary as a function of position in a dimension of diffraction.

8. The method according to claim 6 wherein the corresponding diffraction grating profile comprises a curvature that varies based on optical aberrations in the multi-wavelength optical system.

9. The method according to claim 1 further comprising correcting dispersion of a spectrum in the multi-wavelength channel optical system.

10. The method according to claim 1 further comprising controlling a spot size of an optical beam at an image plane in the multi-wavelength channel optical system.

11. A method of generating an aberration correcting phase profile for use in a wavelength selective switch, the method comprising:
   a) in a model of the wavelength selective switch, inserting a variable phase manipulating element at a first predetermined point wavelength selective switch, the variable phase manipulating element having a controllable phase profile;
   b) measuring properties of optical beams at a second predetermined point in the wavelength selective switch; and
   c) varying the phase profile of the variable phase manipulating element such that the measured optical beam properties substantially match predetermined reference beam properties.

12. The method according to claim 11 further comprising translating the phase profile into a corresponding diffraction grating profile.

13. The method according to claim 12 wherein the corresponding diffraction grating profile comprises a curvature that varies based on optical aberrations in the wavelength selective switch.

14. The method according to claim 11 further comprising writing the grating profile onto a diffraction grating substrate.

15. The method according to claim 14 further comprising spatially dispersing a plurality of wavelength channels and compensating for optical aberrations using the diffraction grating substrate with the grating profile.

16. The method according to claim 11 further comprising correcting dispersion of a spectrum in the wavelength selective switch.

17. The method according to claim 11 further comprising using the wavelength selective switch to generate a filter shape that is substantially symmetric.

18. The method according to claim 17 further comprising using the wavelength selective switch to generate a filter shape for a first polarization state that conforms to a filter shape for a second polarization state.

19. A multi-wavelength optical switch comprising:
   a) at least one input optical port for projecting an input optical beam comprising a plurality of individual wavelength channels;
   b) at least one output optical port for projecting an output optical beam;
   c) switching optics for selectively switching the input optical beam along predetermined paths between the at least one optical input port and the at least one optical output port; and
   d) a diffractive device comprising a substrate and an array of diffraction elements physically written onto the substrate and having a spacing of adjacent diffraction elements, wherein each diffraction element comprises a curvature across the substrate, the array of diffraction elements being configured to:
      i) spatially separate the individual wavelength channels within the input optical beam; and
      ii) impose predefined phase changes to at least one of the plurality of individual wavelength channels to at least partially correct for optical aberrations to the input optical beam, an output from the diffractive device being the output optical beam.

20. The multi-wavelength optical switch according to claim 19 wherein the diffractive device is configured to reduce side lobes in a cross sectional beam spot of the output optical beam.

21. The multi-wavelength optical switch according to claim 19 wherein the diffractive device is configured to control a cross-sectional spot size of the output beam at the at least one output fiber.

22. The multi-wavelength optical switch according to claim 19 wherein the switching optics comprise a LCOS device.

* * * * *